US012675659B2

(12) United States Patent
He

(10) Patent No.: US 12,675,659 B2
(45) Date of Patent: Jul. 7, 2026

(54) MATRIX CODE BASED ON PAN-ARTIFICIAL INTELLIGENCE

(71) Applicant: Liji He, Guangzhou (CN)

(72) Inventor: Liji He, Guangzhou (CN)

( * ) Notice: Subject to any disclaimer, the term of this patent is extended or adjusted under 35 U.S.C. 154(b) by 0 days.

(21) Appl. No.: 19/035,123

(22) Filed: Jan. 23, 2025

(65) Prior Publication Data

US 2026/0044700 A1 Feb. 12, 2026

(30) Foreign Application Priority Data

Aug. 12, 2024 (CN) .......................... 202411101543.2

(51) Int. Cl.
  *G06K 19/06* (2006.01)
  *G06K 7/14* (2006.01)
(52) U.S. Cl.
  CPC ..... *G06K 19/06037* (2013.01); *G06K 7/1426* (2013.01); *G06K 19/06178* (2013.01)
(58) Field of Classification Search
  CPC ....... G06K 19/06037; G06K 19/06178; G06K 7/1404; G06K 7/1417; G06K 7/1426
  See application file for complete search history.

(56) References Cited

U.S. PATENT DOCUMENTS

2025/0322381 A1* 10/2025 Behera ................. G06Q 20/204

FOREIGN PATENT DOCUMENTS

CN 117910498 A * 4/2024 ........... H04L 9/0631

* cited by examiner

*Primary Examiner* — Laura A Gudorf

(57) ABSTRACT

A matrix code based on pan-artificial intelligence, comprising three layers of structure from an outside to an inside, namely, an outer open code area, a core layer code area, and a matrix core layer code area; the outer open code area is generated by AI software according to specific requirements; the core layer code area has a firewall layer and advanced encryption functions, and the core layer code area manages and controls the outer open code area; the matrix core layer code area serves as the most core intervention and correction method of AI, acting as a deep encryption core information zone. Through the use of multi-layer structures and optical media composite materials, the information storage capacity is significantly improved to meet the needs of the big data era; the dual encryption mechanism of the core layer and matrix core layer effectively prevents information leakage and tampering, improves security.

5 Claims, 2 Drawing Sheets

MATRIX CODE BASED ON PAN-ARTIFICIAL INTELLIGENCE

1. TECHNICAL FIELD

The invention relates to the technical field of information coding and identification, in particular to a matrix code based on pan-artificial intelligence.

2. BACKGROUND ART

With the rapid development of information technology, barcodes and QR codes, as important information carriers, have been widely used in various fields such as product identification, logistics tracking, identity verification. However, traditional barcodes and QR codes have obvious limitations, including limited storage capacity, inadequate security, difficulty in adapting to complex and ever-changing environments, and challenges in effectively being applied in dynamic or virtual scenarios. Especially in today's world where artificial intelligence and Internet of Things (IoT) technologies are increasingly sophisticated, the demand for more efficient, secure, and flexible information encoding and recognition methods has become increasingly urgent.

The matrix code is composed in the form of a matrix, where the presence of a dot at the corresponding element positions represents the binary "1", and the absence of a dot represents the binary "0". The arrangement and combination of the dots determine the meaning represented by the matrix code. The dots can be square, circular, or other shapes. The matrix code is a coding system based on computer image processing technology, combinatorial coding principles, and other foundations for automatic recognition of graphic symbols.

Therefore, there is an urgent need for an efficient, safer and more flexible matrix code based on pan-artificial intelligence.

3. SUMMARY OF THE INVENTION

In view of this, the invention aims to solve the following problems existing in the technical background:

1) limited storage capacity: traditional barcodes and QR codes have limited storage capacity, making it difficult to meet the information storage needs in the era of big data;

2) insufficient security: lacking advanced encryption measures, the information is vulnerable to tampering or theft;

3) poor environmental adaptability: the recognition performance is significantly compromised in complex and dynamic environments or scenes.

4) limited application scenarios: they cannot be effectively applied in diverse scenarios such as virtual or non-virtual games.

The invention provides a matrix code based on pan-artificial intelligence. The specific technical scheme is as follows:

a matrix code based on pan-artificial intelligence, comprising three layers of structure from an outside to an inside, namely, an outer open code area, a core layer code area, and a matrix core layer code area;

the outer open code area is generated by AI software according to specific requirements; the core layer code area has a firewall layer and advanced encryption functions, and the core layer code area manages and controls the outer open code area;

the matrix core layer code area serves as the most core intervention and correction method of AI, acting as a deep encryption core information zone;

in one embodiment of the invention, the matrix code uses optical carrier materials and light-related optical media composite materials as a main material medium.

In one embodiment of the invention, the matrix code is divided into two categories: static code and dynamic code, the static code adopts a planar reflective composite material, such as a planar reflective composite material, and the dynamic code adopts a dynamic optical media composite material, such as a dynamic optical media composite material (such as the dynamic change principle of kaleidoscope).

In one embodiment of the invention, the static code and dynamic code both utilize remote signal capture (non-remote signal capture) or remote signal recognition (non-remote signal recognition) technologies to identify and obtain reflective light source information or dynamic light source information.

In one embodiment of the invention, the matrix code belongs to the category of pan-artificial intelligence code, the form of the matrix code can be large or small without restriction, as small as nanometer level or smaller, and is suitable for various real scenes, virtual or non-virtual game scenes.

In one embodiment of the invention, the matrix code is scanned and recognized by the pan-artificial intelligence code scanning terminal, and analyzed and processed by the pan-artificial intelligence code multi-point to multi-point analysis and processing system.

Adopting the above technical scheme, the invention achieves the following advantageous effects:

compared with prior art, the invention has the following the advantages: 1) unlimited storage capacity: through the use of multi-layer structures and optical media composite materials, the information storage capacity is significantly improved to meet the needs of the big data era;

2) advanced encryption to ensure information security: the dual encryption mechanism of the core layer and matrix core layer effectively prevents information leakage and tampering, and improves security;

3) excellent environmental adaptability: whether it is static or dynamic scenes, it can maintain good recognition effect and meet diverse application needs;

4) wide range of application scenarios: not restricted by physical or virtual environments, it can be flexibly applied to various occasions such as real scenes and virtual games, broadening the application field of information coding and recognition.

4. BRIEF DESCRIPTION OF ACCOMPANY DRAWINGS

in the figures: 1 outer open code area, 2 core layer code area, 3 matrix core layer code area.

5. SPECIFIC EMBODIMENT OF THE INVENTION

The technical schemes in the embodiments of the invention will be clearly and completely described in combination with the accompanying drawings in the embodiments of the invention. Obviously, the described embodiments are only some of the embodiments of the invention, but not all of the embodiments. Based on the embodiments in this invention, all other embodiments obtained by those of ordinary skill in the art without making creative efforts shall fall within the protection scope of this invention.

Figure 1:
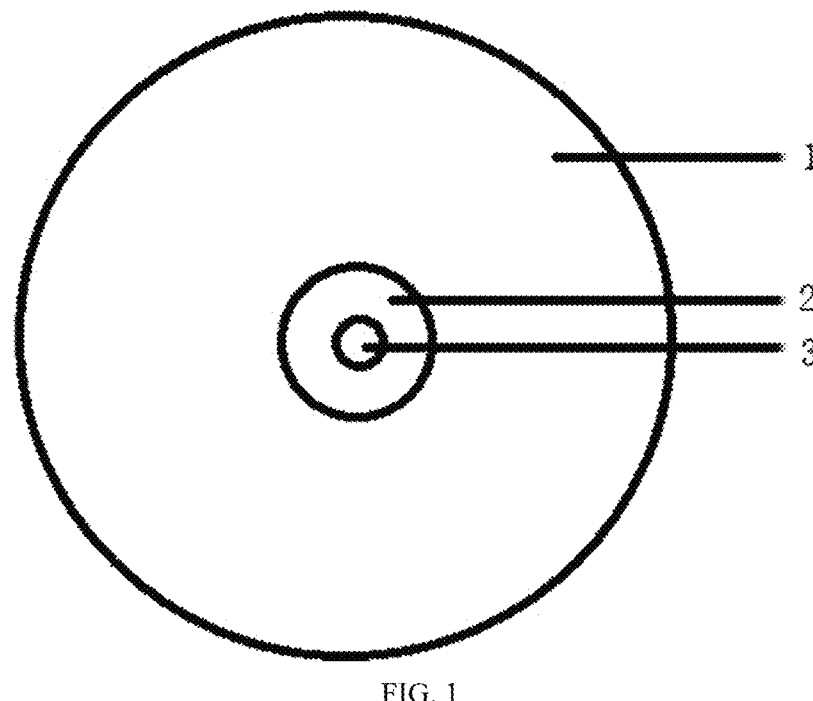
FIG. 1 is a schematic diagram of the structure of a matrix code based on pan-artificial intelligence of the invention.
Figure 2:
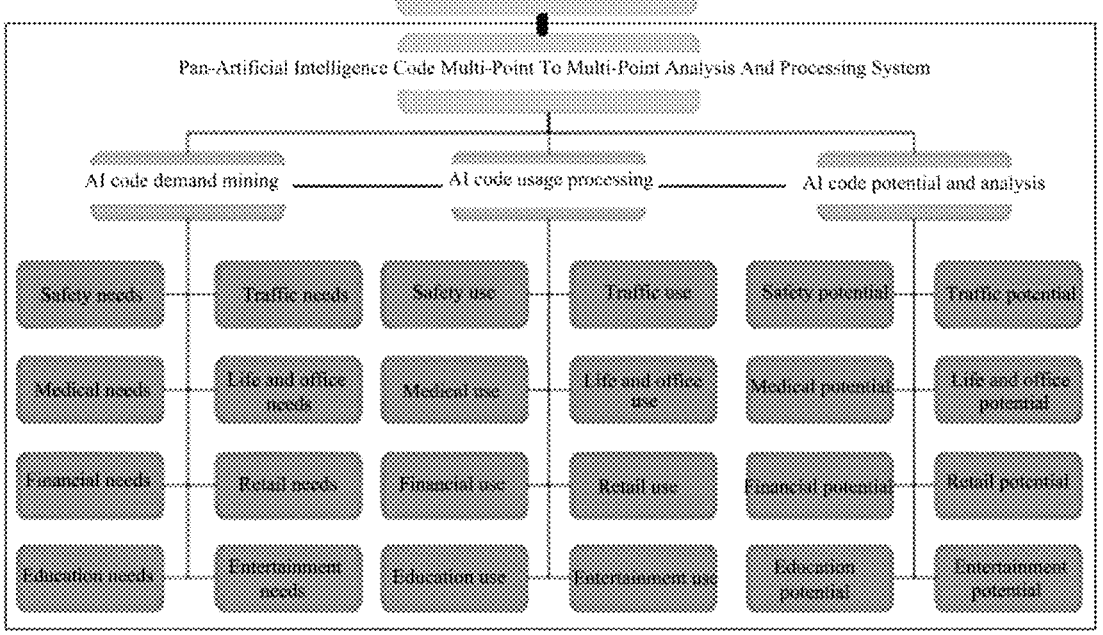
FIG. 2 is a functional application diagram of the matrix code based on pan-artificial intelligence of the invention.

Embodiment 1: as shown in FIG. 1-FIG. 2, a matrix code based on pan-artificial intelligence, comprising three layers of structure from an outside to an inside, namely, an outer open code area, a core layer code area, and a matrix core layer code area;

the outer open code area:
structural features: this area is composed of multiple variable micro-light reflective units, each of units can adjust its reflective characteristics according to different coding requirements to form specific patterns or information. These units are made of materials with high light transmittance and good reflective properties to ensure effective recognition under various lighting conditions.

Connection method: the outer open code area is connected to the core layer code area through a flexible circuit board or optical fiber to achieve information transmission and synchronization.

The core layer code area:
structural features: the core layer code area comprises sophisticated electronic circuits and encryption chips; the electronic circuits are responsible for processing information from the outer open coding area and controlling the operation of the entire system. The encryption chips execute advanced encryption algorithms to ensure the security of information. Additionally, this layer is equipped with a fireproof layer to withstand external physical damage or high-temperature environment.

Connection method: the core layer code area is closely connected with the outer open code area and the matrix core layer code area through precise welding or crimping technology to ensure seamless transmission of information and continuity of processing.

The matrix core layer code area:
structural features: the matrix core layer code area, as the heart of the system, consists of a highly integrated microprocessor and a deep encryption module. The microprocessor is responsible for executing complex logical operations and data processing tasks, while the deep encryption module provides a higher level of information encryption function. This layer also contains a large number of storage units used for storing core information and algorithms.

Connection method: the matrix core layer code area is connected to the core layer code area through an internal bus or a high-speed communication interface to achieve fast data exchange and command transmission.

The outer open code area is generated by AI software according to specific requirements; the core layer code area has the firewall layer and advanced encryption functions, and the core layer code area manages and controls the outer open code area; the matrix core layer code area serves as the most core intervention and correction method of AI, acting as a deep encryption core information zone; the matrix code uses optical carrier materials and light-related optical media composite materials as a main material medium; the matrix code is divided into two categories: static code and dynamic code, the static code adopts a planar reflective composite material, such as a planar reflective composite material, and the dynamic code adopts a dynamic optical media composite material; the static code and dynamic code both utilize remote signal capture (non-remote signal capture) or remote signal recognition (non-remote signal recognition) technologies to identify and obtain reflective light source information or dynamic light source information; the matrix code belongs to the category of pan-artificial intelligence code, the form of the matrix code can be large or small without restriction, as small as nanometer level or smaller, and is suitable for various real scenes, virtual or non-virtual game scenes; the matrix code is scanned and recognized by the pan-artificial intelligence code scanning terminal, and analyzed and processed by the pan-artificial intelligence code multi-point to multi-point analysis and processing system.

Embodiment 2: based on embodiment 1, this embodiment provides a matrix code based on pan-artificial intelligence, comprising three layers of structure from an outside to an inside, namely, an outer open code area, a core layer code area, and a matrix core layer code area; the outer open code area is generated by AI software according to specific requirements; the core layer code area has the firewall layer and advanced encryption functions, and the core layer code area manages and controls the outer open code area; the matrix core layer code area serves as the most core intervention and correction method of AI, acting as a deep encryption core information zone; the matrix code uses optical carrier materials and light-related optical media composite materials as a main material medium; the matrix code is divided into two categories: static code and dynamic code, the static code adopts a planar reflective composite material; the static code in this embodiment adopts the planar reflective composite material.

The dynamic code adopts a dynamic optical media composite material; the dynamic code in this embodiment adopts the dynamic optical media composite material (such as the dynamic change principle of kaleidoscope).

The static code and dynamic code both utilize remote signal capture (non-remote signal capture) or remote signal recognition (non-remote signal recognition) technologies to identify and obtain reflective light source information or dynamic light source information; the matrix code belongs to the category of pan-artificial intelligence code, the form of the matrix code can be large or small without restriction, as small as nanometer level or smaller, and is suitable for various real scenes, virtual or non-virtual game scenes; the matrix code is scanned and recognized by the pan-artificial intelligence code scanning terminal, and analyzed and processed by the pan-artificial intelligence code multi-point to multi-point analysis and processing system.

Embodiment 3: based on embodiment 2, this embodiment provides a matrix code based on pan-artificial intelligence, wherein pan refers to its broad scope, meaning it is widely used, has extensive application materials, diverse display forms, and widespread technological usage, etc. Pan-Artificial Intelligence Code specifically refers to intelligent codes that are entirely created, processed, and recognized by Artificial Intelligence (AI), or intelligent codes that are created, processed, and recognized with the assistance of AI.

The Pan-Artificial Intelligence Matrix Code can use a variety of technological means to achieve the identification, processing, transmission, and storage of information within the AI code body (this includes the recognition, processing, transmission, and storage of artificial intelligence code body informationization and artificial intelligence code body transformation in the form of images) (The category of Pan-Artificial Intelligence Code includes optical matrix codes, optical dimension codes, optical dynamic codes, matrix method codes, AI codes, intelligent array codes, intelligent dynamic codes, intelligent flash codes, intelligent remote sensing codes, and more.

The Pan-Artificial Intelligence Matrix Code is a dynamic or static (without limitation to form), multi-dimensional (including infinite dimensions) three-dimensional composite matrix code body that combines data sources and digital digital bodies arranged in a digital matrix formation; its manifestation or presentation form is not limited by materials or technologies.

The "matrix" in the Pan-Artificial Intelligence Matrix Code is a mathematical term (Matrix). It has the mathematical theoretical basis of the matrix and the concept of the Chinese Eight-Diagram tactics as its essence.

The transmission media and medium of the pan-artificial intelligence matrix code: various optical carrier materials and light-related optical media composite materials, as one of the main material media of the pan-artificial intelligence matrix code.

The form and usage scenarios of the pan-artificial intelligence matrix code: the pan-artificial intelligence matrix code can be large or small, with no restrictions on the form and shape of the code; it can be so small that it is invisible to the naked eye (nanometer level or smaller), which is convenient for hiding and does not hinder the appearance; it is suitable for various real scenes and various virtual scenes (for example: virtual games, (non-virtual games) and other scenes.

Figure 3:
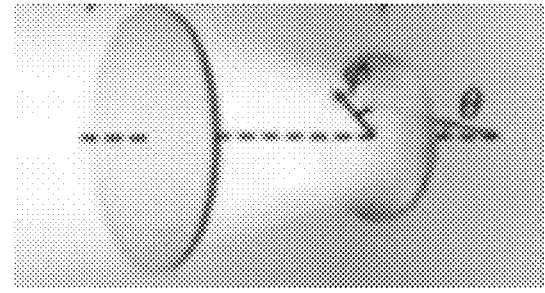
FIG. 3 is a schematic diagram of the matrix code based on pan-artificial intelligence of the invention during transmission.
Figure 4:
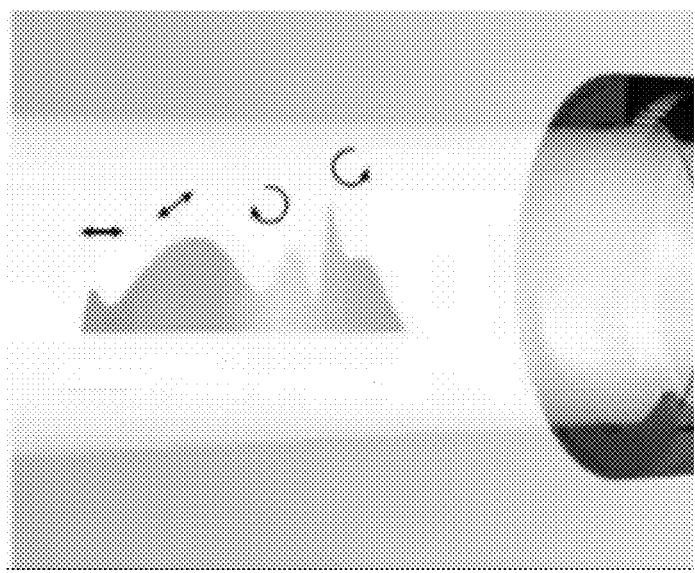
FIG. 4 is a schematic diagram of the matrix code based on pan-artificial intelligence of the invention obtaining reflected light source information or dynamic light source information.

As shown in FIGS. 3 and 4, the code body's light source signal transmits information and propagates by conveying different variations in brightness, wavelengths of light signals, differences in light colors, and changes in light colors.

In this invention, each code area of the matrix code can split into one or countless micro-code bodies with independent functions such as identification, processing, operation, and storage, depending on different situations, scenarios, and needs, either partially or as a whole.

The specific implementation method includes:
Making Matrix Code

Use AI software to generate coded information according to user needs, and control the micro-light reflection unit in the outer open code area to form a specific pattern. Install electronic circuits and encryption chips in the core layer code area and perform fireproof treatment. Integrate a microprocessor and a deep encryption module in the core layer code area and connect to the internal bus or high-speed communication interface. Connect the three-layer structure tightly together through precise welding or crimping technology to form a complete matrix code system.
Deployment and Application The prepared matrix codes are applied to scenarios requiring information encoding and identification, such as product labeling, logistics tracking, identity verification. A pan-artificial intelligence code scanning terminal and a multi-point to multi-point analysis and processing system are configured to ensure accurate and rapid recognition and decoding of the matrix codes. The encoding rules and encryption algorithms of the matrix codes are adjusted according to actual needs, and the information sources of the matrix codes are classified and processed at different levels to adapt to various application scenarios and security requirements.

The partition design and settings of the pan-artificial intelligence matrix code are similar to technologies such as "firewalls" and block "password" chains, which separate ordinary information, important information, and top-secret information; the setting of hierarchical usage permissions can effectively and securely utilize the technologies and functions of AI, while also separating the management and control of AI's "self-awareness" and various uncertainties inherent in AI, as well as big data, cloud computing, various algorithms, and other diverse technologies, so as to achieve governance and secure utilization, ensuring a rational and balanced approach.

Scanning method and analysis and processing method of the pan-artificial intelligence matrix code: the pan-artificial intelligence matrix code is scanned and recognized by the pan-artificial intelligence code scanning terminal, and operated by the pan-artificial intelligence code multi-point to multi-point analysis and processing system; it relies on powerful technologies, algorithms, big data, and large artificial intelligence models to perform complex recognition, computation, analysis, and processing tasks.

The above describes the basic principles and main features of the invention. Those skilled in the art should understand that the invention is not limited to the above embodiments. The above embodiments and descriptions are only for explaining the principles of the invention. Without departing from the spirit and scope of the invention, the invention may have various changes and improvements, which fall within the protect ion scope of the invention. The protection scope of the invention is defined by the claims and their equivalents.

The invention claimed is:

1. A matrix code based on pan-artificial intelligence, comprising three layers of structure from an outside to an inside, namely, an outer open code area, a core layer code area, and a matrix core layer code area;

an outer open code area is generated according to specific requirements;

the core layer code area has a firewall layer and advanced encryption functions, and the core layer code area manages and controls the outer open code area;

the matrix core layer code area serves as a core intervention and correction method, acting as a deep encryption core information zone;

the matrix code uses optical carrier materials and light-related optical media composite materials as a main material medium.

2. The matrix code based on pan-artificial intelligence of claim 1, wherein the matrix code is divided into two categories: static code and dynamic code, the static code adopts a planar reflective composite material and the dynamic code adopts a dynamic optical media composite material.

3. The matrix code based on pan-artificial intelligence of claim 2, wherein the static code and dynamic code both utilize remote signal capture or remote signal recognition technologies to identify and obtain reflective light source information or dynamic light source information.

4. The matrix code based on pan-artificial intelligence of claim 1, wherein the matrix code belongs to a category of pan-artificial intelligence code, a form of the matrix code can be large or small without restriction, as small as nanometer level or smaller, and is suitable for various real scenes, virtual or non-virtual game scenes.

5. The matrix code based on pan-artificial intelligence of claim 1, wherein the matrix code is scanned and recognized by a pan-artificial intelligence code scanning terminal, and analyzed and processed by a pan-artificial intelligence code multi-point to multi-point analysis and processing system.

\* \* \* \* \*